United States Patent
Su et al.

(10) Patent No.: US 11,069,892 B2
(45) Date of Patent: Jul. 20, 2021

(54) ACTIVE MATERIAL FOR NEGATIVE ELECTRODE, NEGATIVE ELECTRODE PIECE, AND SECONDARY BATTERY

(71) Applicant: CONTEMPORARY AMPEREX TECHNOLOGY CO., LIMITED, Ningde (CN)

(72) Inventors: Yisong Su, Ningde (CN); Yongsheng Guo, Ningde (CN); Chengdu Liang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 224 days.

(21) Appl. No.: 16/355,416

(22) Filed: Mar. 15, 2019

(65) Prior Publication Data

US 2019/0296356 A1    Sep. 26, 2019

Related U.S. Application Data

(63) Continuation-in-part of application No. PCT/CN2017/093544, filed on Jul. 19, 2017.

(30) Foreign Application Priority Data

Sep. 18, 2016 (CN) .......................... 201610827228.7

(51) Int. Cl.
| | |
|---|---|
| H01M 4/00 | (2006.01) |
| H01M 4/60 | (2006.01) |
| H01M 10/04 | (2006.01) |
| H01M 4/137 | (2010.01) |
| H01M 10/0525 | (2010.01) |
| H01M 4/36 | (2006.01) |
| H01M 4/02 | (2006.01) |

(52) U.S. Cl.
CPC ........... *H01M 4/602* (2013.01); *H01M 4/137* (2013.01); *H01M 4/36* (2013.01); *H01M 4/60* (2013.01); *H01M 10/04* (2013.01); *H01M 10/0525* (2013.01); *H01M 2004/027* (2013.01)

(58) Field of Classification Search
CPC .... H01M 4/60; H01M 10/0525; H01M 10/26; H01M 4/36; H01M 4/366; H01M 2004/027; H01M 10/04
See application file for complete search history.

(56) References Cited

U.S. PATENT DOCUMENTS

| | | | |
|---|---|---|---|
| 2012/0326078 A1 | 12/2012 | Chung et al. | |
| 2013/0183582 A1 | 7/2013 | Halalay et al. | |
| 2020/0399146 A1* | 12/2020 | Su | C02F 1/469 |

FOREIGN PATENT DOCUMENTS

| | | |
|---|---|---|
| CN | 104659342 A | 5/2015 |
| CN | 105789702 A | 7/2016 |

OTHER PUBLICATIONS

Contemporary Amperex Technology Co., Limited, Extended European Search Report, EP17850117.7, dated May 25, 2020, 8 pgs.
Contemporary Amperex Technology Co., Limited, International Search Report and Written Opinion, PCT/CN2017/093544, dated Nov. 9, 2017, 12 pgs.
Contemporary Amperex Technology Co., Limited, International Preliminary Report on Patentability, PCT/CN2017/093544, dated Mar. 19, 2019, 4 pgs.

* cited by examiner

*Primary Examiner* — Cynthia H Kelly
*Assistant Examiner* — Monique M Wills
(74) *Attorney, Agent, or Firm* — Morgan, Lewis & Bockius LLP

(57) ABSTRACT

A negative electrode active material, a negative electrode plate and a secondary battery. The negative electrode active material comprises a chelating resin and a metal ion. The chelating resin comprises a polymer skeleton and a chelating functional group. The chelating functional group is fixedly connected to the polymer skeleton via a chemical bond. The metal ion is connected with the chelating resin by an ionic bond and/or a coordinate bond via the chelating functional group. The chelating resin further comprises a free small molecular compound containing the chelating functional group. In the chelating resin, a mass percentage of the free small molecular compound containing the chelating functional is less than or equal to 1%. The metal ion is a divalent or multivalent metal ion. When the negative electrode active material is applied to the secondary battery, the secondary battery can achieve both high coulombic efficiency and high cycle stability.

20 Claims, No Drawings

ACTIVE MATERIAL FOR NEGATIVE ELECTRODE, NEGATIVE ELECTRODE PIECE, AND SECONDARY BATTERY

REFERENCE TO RELATED APPLICATIONS

This application is a continuation-in-part application of PCT/CN2017/093544, filed on Jul. 19, 2017, which claims priority to Chinese Patent Application No. 201610827228.7, filed with the State Intellectual Property Office of the People's Republic of China on Sep. 18, 2016, all of which are incorporated herein by reference in their entirety.

FIELD OF THE PRESENT DISCLOSURE

The present application relates to the field of battery technology, and more specifically relates to a negative electrode active material, a negative electrode plate and a secondary battery.

BACKGROUND OF THE PRESENT DISCLOSURE

In a new type of battery, a lithium ion metal oxide is used in a positive electrode, high capacity and higher potential of the lithium ion metal oxide ensure that the battery has higher output voltage and specific capacity. A chelating resin is used in a negative electrode, the chelating resin will adsorb a divalent metal ion in an electrolyte and decrease the concentration of the divalent metal ion, so that it will reduce the formation of corresponding metal dendrite and improve cycle life of the battery. The electrolyte is a neutral lithium-ion aqueous solution, which may ensure very high conductivity and extremely low corrosivity. The combination of these properties ensures that the battery has long life, high capacity and high voltage, which is very suitable as a substitute for lead-acid battery.

However, a mass of the chelating resin in the negative electrode plate plays a key role on the performance of the battery, conventional chelating resin cannot effectively avoid the formation of metal dendrite, so how to improve the performance of the chelating resin has become a technical difficulty always existing in this field.

SUMMARY OF THE PRESENT DISCLOSURE

In view of the problem existing in the background, an object of the present disclosure is to provide a negative electrode active material, a negative electrode plate and a secondary battery, the negative electrode active material has high specific capacity, when the negative electrode active material is applied to the secondary battery, the secondary battery can achieve both high coulombic efficiency and high cycle stability.

In order to achieve the above object, in one aspect of the present disclosure, the present disclosure provides a negative electrode active material, which comprises a chelating resin and a metal ion. The chelating resin comprises a polymer skeleton and a chelating functional group. The chelating functional group is fixedly connected to the polymer skeleton via a chemical bond. The metal ion is connected with the chelating resin by an ionic bond and/or a coordinate bond via the chelating functional group. The chelating resin further comprises a free small molecular compound containing the chelating functional group. In the chelating resin, a mass percentage of the free small molecular compound containing the chelating functional is less than or equal to 1%. The metal ion is a divalent or multivalent metal ion.

In another aspect of the present disclosure, the present disclosure provides a negative electrode plate, which comprises a negative electrode current collector and a negative electrode film. The negative electrode film is provided on the negative electrode current collector and comprises a negative electrode active material, a negative electrode conductive agent and a negative electrode binder. The negative electrode active material is the negative electrode active material according to the one aspect of the present disclosure.

In still another aspect of the present disclosure, the present disclosure provides a secondary battery, which comprises the negative electrode plate according to the another aspect of the present disclosure.

Compared to the technologies in the background, the present disclosure has the following beneficial effects: the negative electrode active material of the present disclosure has high specific capacity, when the negative electrode active material of the present disclosure is applied to the secondary battery, the secondary battery can achieve both high coulombic efficiency and high cycle stability.

DETAILED DESCRIPTION

Hereinafter a negative electrode active material, a negative electrode plate and a secondary battery according to the present disclosure will be described in detail.

Firstly, a negative electrode active material according to the first aspect of the present disclosure will be described.

The negative electrode active material according to the first aspect of the present disclosure comprises a chelating resin and a metal ion. The chelating resin comprises a polymer skeleton and a chelating functional group. The chelating functional group is fixedly connected to the polymer skeleton via a chemical bond. The metal ion is connected with the chelating resin by an ionic bond and/or a coordinate bond via the chelating functional group. The chelating resin further comprises a free small molecular compound containing the chelating functional group (hereinafter abbreviated as free small molecular compound). In the chelating resin, a mass percentage of the free small molecular compound containing the chelating functional is less than or equal to 1%. The metal ion is a divalent or multivalent metal ion.

In the negative electrode active material according to the first aspect of the present disclosure, during the charging process, the divalent or multivalent metal ion transforms into a metal elementary substance on the chelating resin, charge balance is maintained by lithium ions deintercalated from a positive electrode plate; during the discharging process, the metal elementary substance will gradually transforms into the divalent or multivalent metal ion and the divalent or multivalent metal ion will be fixed by the chelating resin, while extra lithium ions will intercalate into the positive electrode active material again. Therefore, during the charging and discharging process, the chelating resin can not only chelate the divalent or multivalent metal ion, but also fix the divalent or multivalent metal ion, so that the chelating resin can avoid the divalent or multivalent metal ion entering into an electrolyte, reduce a concentration of the free divalent or multivalent metal ion in the electrolyte, and effectively decrease the formation of a metal dendrite. However, due to the effect of the preparation process of the chelating resin, the free small molecular compound will unavoidably mix into the chelating resin, and the free small molecular compound will also participate in chelating the divalent or multivalent metal ion, but during the charging process, the free small molecular compound cannot fix the divalent or multivalent metal ion, which makes this part of divalent or multivalent metal ion easy to grow a metal dendrite inside the secondary battery (the metal dendrite can be grown anywhere inside the secondary battery, because the free small molecular compound can free to anywhere inside the secondary battery), and the free small molecular compound cannot play a role of inhibiting the metal dendrite, which will destroy cycle performance of the secondary battery, so it is necessary to strictly limit a content of the free small molecular compound In the negative electrode active material according to the first aspect of the present disclosure, the polymer skeleton is one selected from a group consisting of polystyrene, polyvinyl chloride, polymethacrylate, polyacrylic acid, polyethylene and polypropylene.

In the negative electrode active material according to the first aspect of the present disclosure, the chelating functional group is one or more selected from a group consisting of phosphate group, aminophosphate group, aminocarboxylic group (—NCH(COOH)), carboxyl group (—COOH) and thioureido group (—C(C—S)NH). The chelating functional group can selectively chelate with the divalent or multivalent metal ion without chelating with a monovalent metal ion. Wherein, the aminocarboxylic group is preferably selected from iminodiacetic group.

In the negative electrode active material according to the first aspect of the present disclosure, on the polymer skeleton, a ratio of a number of repeating units connected with the chelating functional group to a number of total repeating units of the polymer skeleton is greater than or equal to 50%. Preferably, the ratio of the number of repeating units connected with the chelating functional group to the number of total repeating units of the polymer skeleton is greater than or equal to 70%. Further preferably, the ratio of the number of repeating units connected with the chelating functional group to the number of total repeating units of the polymer skeleton is greater than or equal to 85%.

In the negative electrode active material according to the first aspect of the present disclosure, in the chelating resin, the mass percentage of the free small molecular compound containing the chelating functional group is less than or equal to 0.1%. Preferably, the mass percentage of the free small molecular compound containing the chelating functional group is less than or equal to 0.01%.

In the negative electrode active material according to the first aspect of the present disclosure, the metal ion is one selected from a group consisting of $Zn^{2+}$, $Pb^{2+}$, $Sn^{2+}$, $Cd^{2+}$, $Fe^{2+}$ and $Ni^{2+}$.

Secondly, a negative electrode plate according to a second aspect of the present disclosure will be described.

The negative electrode plate according to the second aspect of the present disclosure comprises a negative electrode current collector and a negative electrode film. The negative electrode film is provided on the negative electrode current collector and comprises a negative electrode active material, a negative electrode conductive agent and a negative electrode binder. The negative electrode active material is the negative electrode active material according to the first aspect of the present disclosure.

In the negative electrode plate according to the second aspect of the present disclosure, the negative electrode plate further comprises a metal layer. The metal layer is provided between the negative electrode film and the negative electrode current collector and a metal element of the metal layer is the same as the metal ion of the negative electrode active material. The metal elementary substance of the metal layer will gradually transform to the metal ion, this will replenish the continuous loss of the metal ion, so it can significantly improve the cycle life of the secondary battery, maintaining the capacity of the secondary battery, so that the capacity of the secondary battery does not decrease when the cycle process goes on.

In the negative electrode plate according to the second aspect of the present disclosure, the metal layer is one selected from a group consisting of a Zn layer, a Pb layer, a Sn layer, a Cd layer, a Fe layer and a Ni layer.

In the negative electrode plate according to the second aspect of the present disclosure, the negative electrode current collector is selected from a brass foil, a copper foil, a nickel foil, a titanium foil or a stainless steel foil.

In the negative electrode plate according to the second aspect of the present disclosure, the negative electrode conductive agent is one or more selected from a group consisting of conductive carbon black, superconductive carbon black, conductive graphite, acetylene black, graphene and carbon nanotube.

In the negative electrode plate according to the second aspect of the present disclosure, the negative electrode binder is one or more selected from a group consisting of polyvinylidene fluoride (PVDF), polytetrafluoroethylene (PTFE) emulsion, polyvinyl alcohol, polyurethane, polyacrylate, butyl rubber, epoxy resin, polyvinyl acetate resin and chlorinated rubber.

Thirdly, a secondary battery according to a third aspect of the present disclosure will be described.

The secondary battery according to the third aspect of the present disclosure comprises the negative electrode plate according to the second aspect of the present disclosure.

In the secondary battery according to the third aspect of the present disclosure, the secondary battery further comprises an electrolyte, a positive electrode plate and a separator.

In the secondary battery according to the third aspect of the present disclosure, the electrolyte is aqueous solution electrolyte, which comprises a water and a water-soluble electrolyte salt. The electrolyte salt may be lithium salt or sodium salt. Specifically, the lithium salt may be one or more selected from a group consisting of lithium sulfate ($Li_2SO_4$), lithium trifluoromethanesulfonate and methanesulfinic acid lithium salt. The sodium salt may be selected from a group consisting of sodium sulfate ($Na_2SO_4$), sodium trifluoromethanesulfonate and methanesulfinic acid sodium salt.

In the secondary battery according to the third aspect of the present disclosure, the positive electrode plate comprises a positive electrode current collector and a positive electrode film. The positive electrode film is provided on the positive electrode current collector and comprises a positive electrode active material, a positive electrode conductive agent and a positive electrode binder.

In the secondary battery according to the third aspect of the present disclosure, the positive electrode active material may be selected from lithium-containing positive electrode active material (correspondingly lithium salt is used as the electrolyte salt) or sodium-containing positive electrode active material (correspondingly sodium salt is used as the electrolyte salt). The lithium-containing positive electrode active material may be one or more selected from a group consisting of layered lithium metal oxide, spinel lithium metal oxide, lithium metal phosphate, lithium metal fluoride sulfate and lithium metal vanadate. The layered lithium metal oxide may be one or more selected from a group consisting of lithium cobalt oxide (LCO), nickel cobalt manganese ternary material (NCM) and nickel cobalt aluminum ternary material (NCA). The spinel lithium metal oxide may be selected from lithium manganese oxide ($LiMn_2O_4$). The lithium metal phosphate may be selected from lithium iron phosphate (LFP). The lithium metal fluoride sulfate may be selected from lithium cobalt sulfate fluoride ($LiCoFSO_4$). The lithium metal vanadate may be selected from lithium nickel vanadate ($LiNiVO_4$). The sodium-containing positive electrode active material may be one or more selected from a group consisting of layered sodium metal oxide and polyanionic sodium positive electrode active material. Specifically, the sodium-containing positive electrode active material may be one or more selected from a group consisting of $NaCoO_2$, $NaMnO_2$, $Na_3V_2(PO_4)_3$, $NaVPO_4F$, $NaFePO_4$, $Na_2FePO_4F$, $Na_2CoPO_4F$, $Na_2FeP_2O_7$, $Na_2CoP_2O_7$, $Na_4Fe_3(PO_4)_2P_2O_7$ and $Na_4Co_3(PO_4)_2P_2O_7$.

In the secondary battery according to the third aspect of the present disclosure, the separator is a hydrophilic separator. Specifically, the separator may be one selected from a group consisting of glass fibre, non-woven fabrics, hydrophilic polypropylene membrane and water-based filter paper.

Hereinafter the present disclosure will be described in detail in combination with examples. It should be noted that, the examples described in the present disclosure are only used for explaining the present disclosure, and are not intended to limit the present disclosure.

In the following example, the materials, reagents and instruments used are commercially available unless otherwise specified.

Taking synthesis process of the chelating resin which polystyrene is used as the polymer skeleton, iminodiacetic group is used as the chelating functional group for instance, the specific synthesis process is as follows: taking glycidyl methacrylate (GMA) as a monomer, chloromethylated cross-linked polystyrene (CMCPS) resin as a macroinitiator, CuBr/2,2'-bipyridine (Bpy) as a catalytic agent, and GMA is polymerized on a surface of CMCPS resin by surface-initiated atom transfer radical polymerization, an epoxidized polymer is obtained, immersing this polymer into dimethyl sulfoxide for 12 h, then adding a certain amount of an aqueous solution containing iminodiacetic acid (IDA), reacting with IDA at 80° C. for a certain period of time and obtaining the chelating resin (abbreviated as IDA-PGMA-CMCPS) in which polystyrene is used as the polymer skeleton and iminodiacetic group is used as the chelating functional group. By controlling the reacting time of PGMA-CMCPS resin and IDA, the grafting ratio of IDA can be controlled, by controlling washing process of IDA-PGMA-CMCPS chelating resin, a content of free IDA in the chelating resin can be controlled. The synthesis and purification process of other chelating resins are similar, only need to change corresponding polymer skeleton and corresponding chelating functional group according to the demand.

The ratio of the number of repeating units connected with the chelating functional group to the number of total repeating units of the polymer skeleton is determined by an amount of unit mass of the chelating resin chelated with copper ions. The specific process is: uniformly mixing cupric sulfate solution with a concentration of $C_0$ and a volume of $V_0$ and the chelating resin with a mass of m in an aqueous solution, after oscillating and adsorbing for 24 h in the constant temperature oscillator, taking the supernatant to measure a concentration of the remaining divalent copper ion and mark as $C_e$, and the adsorption amount of the unit mass of the chelating resin can be calculated as $(C_0-C_e)\cdot V_0/m$. From this, the ratio of the number of repeating units connected with the chelating functional group to the total number of repeating units of the polymer skeleton can be calculated.

By measuring a concentration of chelating functional group (for example IDA) in the filtrate during the preparation process of the chelating resin chelating resin to determine the content of the free small molecular compound in the chelating resin. The specific process is: determining a concentration of IDA in the filtrate after each filtration process by means of absorption spectral intercomparison and marking as C, the volume of the filtrate is V, the mass of IDA in unit mass of the chelating resin is $M=C\cdot V/m$.

Example 1

(1) Preparation of a negative electrode active material: chelating resin in which polystyrene was used as the polymer skeleton and iminodiacetic group was used as the chelating functional group (wherein, the ratio of the number of repeating units connected with the chelating functional group to the number of total repeating units of the polymer skeleton was 85:100, a content of the free small molecular compound was 0.01%) was fully stirred and mixed with excessive zinc sulfate solution for 24 h, after filtering away the liquid and drying at 60° C., the negative electrode active material was obtained; a negative electrode active material was dispersed in anhydrous ethanol and placed in a ball miller for ball-milling for 4 h at a speed of 550 rmp, then dried in an oven at 80° C., a negative electrode active material powder of 200 or less mesh was separated by a sieve for preparing a negative electrode plate.

(2) Preparation of a negative electrode plate: the negative electrode active material, conductive carbon SP001 (negative electrode conductive agent) and PTFE emulsion (negative electrode binder) at a weight ratio of 80:10:10 were fully stirred and uniformly mixed in an ethanol, a negative electrode slurry was obtained, the negative electrode slurry was then pressed into a negative electrode film with a thickness of 1 mm and an area weight of 300 g/m$^2$, and then the negative electrode film was cut into a size of 2.3×2.9 cm$^2$ and placed in an oven at 80° C. to remove the ethanol. A zinc foil (metal layer) was placed between the negative electrode film and a brass foil (negative electrode current collector) with a thickness of 30 μm and pressed, so that the brass foil (negative electrode current collector), the zinc foil layer (metal layer) and the negative electrode film were in close contact, the preparation of a negative electrode plate was finished.

(3) Preparation of a positive electrode plate: lithium manganese oxide (positive electrode active material), conductive carbon SP001 (positive electrode conductive agent) and PTFE emulsion (positive electrode binder) at a weight ratio of 70:20:10 were fully stirred and uniformly mixed in a deionized water, a positive electrode slurry was obtained, then the positive electrode slurry was pressed into a positive electrode film with a thickness of 0.6 mm and an area of 500 g/m$^2$, and then the positive electrode film was cut into a size of 2.2×2.8 cm$^2$ and placed in a oven at 130° C. to remove the deionized water. Finally the positive electrode film and a graphite foil (positive electrode current collector) with a thickness of 100 μm were pressed, the preparation of a positive electrode plate was finished.

(4) Preparation of an electrolyte: 2M methanesulfinic acid lithium salt solution which was prepared by methanesulfinic acid lithium salt and deionized water was used as an electrolyte, and pH of the electrolyte was adjusted to 8 to 8.5 with lithium hydroxide.

(5) Preparation of a secondary battery: the positive electrode plate, a glass fibre (hydrophilic separator) and the negative electrode plate were laminated to make the separator separate the positive electrode plate from the negative electrode plate, then were wound to form an electrode assembly and the electrode assembly was placed in a package case, then 0.8 ml of the above prepared electrolyte was injected into the dried electrode assembly, after vacuum packaging, standing-by, shaping and the like, a secondary battery was obtained.

Example 2

The preparation was the same as example 1, except that in: (1) preparation of a negative electrode active material, in the chelating resin, the ratio of the number of repeating units connected with the chelating functional group to the number of total repeating units of the polymer skeleton was 70:100, the content of the free small molecular compound was 0.01%.

Example 3

The preparation was the same as example 1, except that in: (1) preparation of a negative electrode active material, in the chelating resin, the ratio of the number of repeating units connected with the chelating functional group to the number of total repeating units of the polymer skeleton was 50:100, the content of the free small molecular compound was 0.01%.

Example 4

The preparation was the same as example 1, except that in: (1) preparation of a negative electrode active material, in the chelating resin, the ratio of the number of repeating units connected with the chelating functional group to the number of total repeating units of the polymer skeleton was 85:100, the content of the free small molecular compound was 0.1%.

Example 5

The preparation was the same as example 1, except that in: (1) preparation of a negative electrode active material, in the chelating resin, the ratio of the number of repeating units connected with the chelating functional group to the number of total repeating units of the polymer skeleton was 85:100, the content of the free small molecular compound was 1%.

Example 6

The preparation was the same as example 1, except that in: (1) preparation of a negative electrode active material, polystyrene was used as the polymer skeleton of the chelating resin, phosphate group was used as the chelating functional group of the chelating resin, wherein the ratio of the number of repeating units connected with the chelating functional group to the number of total repeating units of the polymer skeleton was 85:100, the content of the free small molecular compound was 0.01%.

Example 7

The preparation was the same as example 1, except that in: (1) preparation of a negative electrode active material, polyacrylic acid was used as the polymer skeleton of the chelating resin, acetoxy group was used as the chelating functional group of the chelating resin, wherein the ratio of the number of repeating units connected with the chelating functional group to the number of total repeating units of the polymer skeleton was 99.9:100, the content of the free small molecular compound was 0.01%.

Example 8

The preparation was the same as example 1, except that in: (1) preparation of a negative electrode active material, chelating resin in which polystyrene was used as the polymer skeleton and iminodiacetic group was used as the chelating functional group (wherein, the ratio of the number of repeating units connected with the chelating functional group to the number of total repeating units of the polymer skeleton was 85:100, a content of free small molecular compound was 0.01%) was fully stirred and mixed with excessive zinc sulfate solution for 24 h, after filtering liquid and drying at 60° C., a negative electrode active material was obtained; the negative electrode active material was dispersed in anhydrous ethanol and placed in a ball miller for ball-milling for 4 h at a speed of 550 rmp, then dried in an oven at 80° C., a negative electrode active material powder of 200 or less mesh was separated by a sieve for preparing a negative electrode plate; (2) preparation of a negative electrode plate, a nickel foil (metal layer) was placed between the negative electrode film and a brass foil (negative electrode current collector) with a thickness of 30 µm and pressed, so that the brass foil (negative electrode current collector), the nickel foil layer (metal layer) and the negative electrode film were in close contact.

Example 9

The preparation was the same as example 1, except that in: (3) preparation of a positive electrode plate, lithium iron phosphate was used as the positive electrode active material.

Comparative Example 1

The preparation was the same as example 1, except that in: (1) preparation of a negative electrode active material, in the chelating resin, the ratio of the number of repeating units connected with the chelating functional group to the number of total repeating units of the polymer skeleton was 40:100, the content of the free small molecular compound was 0.01%.

Comparative Example 2

The preparation was the same as example 1, except that in: (1) preparation of a negative electrode active material, in the chelating resin, the ratio of the number of repeating units connected with the chelating functional group to the number of total repeating units of the polymer skeleton was 85:100, the content of the free small molecular compound was 1.5%.

Comparative Example 3

The preparation was the same as example 6, except that in: (1) preparation of a negative electrode active material, in the chelating resin, the ratio of the number of repeating units connected with the chelating functional group to the number of total repeating units of the polymer skeleton was 40:100, the content of the free small molecular compound was 0.01%.

Comparative Example 4

The preparation was the same as example 6, except that in: (1) preparation of a negative electrode active material, in the chelating resin, the ratio of the number of repeating units connected with the chelating functional group to the number of total repeating units of the polymer skeleton was 85:100, the content of the free small molecular compound was 1.5%.

Comparative Example 5

The preparation was the same as example 7, except that in: (1) preparation of a negative electrode active material, in the chelating resin, the ratio of the number of repeating units connected with the chelating functional group to the number of total repeating units of the polymer skeleton was 99.9:100, the content of the free small molecular compound was 1.5%.

Comparative Example 6

The preparation was the same as example 8, except that in: (1) preparation of a negative electrode active material, in the chelating resin, the ratio of the number of repeating units connected with the chelating functional group to the number of total repeating units of the polymer skeleton was 40:100, the content of the free small molecular compound was 0.01%.

Comparative Example 7

The preparation was the same as example 8, except that in: (1) preparation of a negative electrode active material, in the chelating resin, the ratio of the number of repeating units connected with the chelating functional group to the number of total repeating units of the polymer skeleton was 85:100, the content of the free small molecular compound was 1.5%.

Comparative Example 8

The preparation was the same as example 9, except that in: (1) preparation of a negative electrode active material, in the chelating resin, the ratio of the number of repeating units connected with the chelating functional group to the number of total repeating units of the polymer skeleton was 40:100, the content of the free small molecular compound was 0.01%.

Comparative Example 9

The preparation was the same as example 9, except that in: (1) preparation of a negative electrode active material, in the chelating resin, the ratio of the number of repeating units connected with the chelating functional group to the number of total repeating units of the polymer skeleton was 85:100, the content of the free small molecular compound was 1.5%.

Next, test processes of the secondary battery were described.

In a voltage range of 1.5V~2.3V, the secondary battery was charged at a constant current of 0.5 C, then the secondary battery was discharged at the constant current of 0.5 C, and based on this, a cycle test was performed.

(1) Testing of Specific Capacity of the Negative Electrode Active Material

Specific capacity of the negative electrode active material (mAh/g)=Discharged capacity obtained by discharging at a constant current of 0.5 C after cycle of the secondary battery was stabilized/Mass of the negative electrode active material.

(2) Testing of Cycle Performance of the Secondary Battery

Cycle performance of the secondary battery was expressed by cycle times when the initial capacity of the secondary battery decayed to 80%, the more the cycle times was, the better the cycle performance of the secondary battery was.

(3) Testing of Coulombic Efficiency of the Secondary Battery

Coulombic efficiency of the secondary battery (%)=Discharged capacity obtained by discharging at a constant current of 0.5 C after cycle of the secondary battery was stabilized/Charged capacity obtained by discharging at a constant current of 0.5 C after cycle of the secondary battery was stabilized×100%.

Here, what the applicant needed to explain was that, "cycle stabilization" meant that impurity was exhausted after 3 to 10 times cycling of the secondary battery, electrolyte infiltration was completed, and the specific capacity of the negative electrode active material and the coulombic efficiency of the secondary battery were both the calculation results after tending to be stabilized.

TABLE 1

Test results of examples 1-9 and comparative examples 1-9

| | Grafting rate | Content of the free small molecular compound | Specific capacity (mAh/g) | Cycle times | Coulombic efficiency |
|---|---|---|---|---|---|
| Example 1 | 85:100 | 0.01% | 134 | 957 | 99.50% |
| Example 2 | 70:100 | 0.01% | 107 | 903 | 99.50% |
| Example 3 | 50:100 | 0.01% | 80 | 923 | 99.50% |
| Example 4 | 85:100 | 0.10% | 128 | 768 | 98.90% |
| Example 5 | 85:100 | 1.00% | 117 | 316 | 98.50% |
| Example 6 | 85:100 | 0.01% | 145 | 877 | 99.40% |
| Example 7 | 99.9:100 | 0.01% | 96 | 586 | 99.20% |
| Example 8 | 85:100 | 0.01% | 98 | 838 | 99.30% |
| Example 9 | 85:100 | 0.01% | 132 | 1195 | 99.50% |
| Comparative example 1 | 40:100 | 0.01% | 35 | 964 | 99.50% |
| Comparative example 2 | 85:100 | 1.50% | 112 | 137 | 97.60% |
| Comparative example 3 | 40:100 | 0.01% | 39 | 892 | 99.40% |
| Comparative example 4 | 85:100 | 1.50% | 127 | 126 | 96.80% |
| Comparative example 5 | 99.9:100 | 1.50% | 87 | 94 | 96.20% |
| Comparative example 6 | 40:100 | 0.01% | 25 | 816 | 99.30% |
| Comparative example 7 | 85:100 | 1.50% | 97 | 84 | 97.20% |
| Comparative example 8 | 40:100 | 0.01% | 38 | 1217 | 99.50% |
| Comparative example 9 | 85:100 | 1.50% | 122 | 183 | 97.10% |

It could be analyzed from test results in Table 1: it could be seen from the comparison of examples 1-3 and comparative example 1, with the decrease of the ratio of the number of repeating units connected with the chelating functional group to the number of total repeating units of the polymer skeleton, the specific capacity of the negative electrode active material was gradually decreased. This was because that the chelating functional group was equivalent to an active group of the negative electrode, and the decrease of the content of the chelating functional group directly affected the content of the active group of the negative electrode, thus resulting in decrease of the specific capacity.

From the comparison of example 1, examples 4-5 and comparative example 2, it could be seen that with the increase of the content of the free small molecular compound, the cycle performance and the coulombic efficiency of the secondary battery was significantly decreased. This was because that the free small molecular compound could not fix the metal ion, so that the formation of metal dendrite cannot be avoided, and the free small molecular compound would compete for metal ion with the chelating functional group fixed on the polymer skeleton, so that the chelating functional group fixed on the polymer skeleton could not play a role of fixing metal ion, so the secondary battery was disabled in mechanism and could not inhibit the growth of metal dendrite, thereby seriously affecting the coulombic efficiency and cycle performance of the secondary battery The same conclusions as above could be obtained from the comparison of example 6 and comparative examples 3-4, example 7 and comparative examples 5, example 8 and comparative examples 6-7 and example 9 and comparative examples 8-9.

According to the disclosure of the above description, those skilled in the art may also make an appropriate change and modification to the above examples. Therefore, the present disclosure is not limited to the specific examples disclosed and described above, and some modifications and change to the present disclosure should also fall within the scope of protection of the Claims of the present disclosure.

What is claimed is:

1. A negative electrode active material, comprising a chelating resin and a metal ion;
   the chelating resin comprising a polymer skeleton and a chelating functional group;
   the chelating functional group being fixedly connected to the polymer skeleton via a chemical bond;
   the metal ion being connected with the chelating resin by an ionic bond and/or a coordinate bond via the chelating functional group;
   wherein,
   the chelating resin further comprises iminodiacetic acid;
   in the chelating resin, a mass percentage of iminodiacetic acid is less than or equal to 1%;
   the metal ion is a divalent or multivalent metal ion.

2. The negative electrode active material according to claim 1, wherein the polymer skeleton is one selected from a group consisting of polystyrene, polyvinyl chloride, polymethacrylate, polyacrylic acid, polyethylene and polypropylene.

3. The negative electrode active material according to claim 1, wherein the chelating functional group is one or more selected from a group consisting of phosphate group, aminophosphate group, aminocarboxylic group, carboxyl group and thioureido group.

4. The negative electrode active material according to claim 1, wherein on the polymer skeleton, a ratio of a number of repeating units connected with the chelating functional group to a number of total repeating units of the polymer skeleton is greater than or equal to 50%.

5. The negative electrode active material according to claim 4, wherein on the polymer skeleton, the ratio of the number of repeating units connected with the chelating functional group to the number of total repeating units of the polymer skeleton is greater than or equal to 70%.

6. The negative electrode active material according to claim 5, wherein on the polymer skeleton, the ratio of the number of repeating units connected with the chelating functional group to the number of total repeating units of the polymer skeleton is greater than or equal to 85%.

7. The negative electrode active material according to claim 1, wherein in the chelating resin, the mass percentage of iminodiacetic acid is less than or equal to 0.1%.

8. The negative electrode active material according to claim 7, wherein in the chelating resin, the mass percentage of iminodiacetic acid is less than or equal to 0.01%.

9. The negative electrode active material according to claim 1, wherein the metal ion is one selected from a group consisting of $Zn^{2+}$, $Pb^{2+}$, $Sn^{2+}$, $Cd^{2+}$, $Fe^{2+}$ and $Ni^{2+}$.

10. A negative electrode plate, comprising:
    a negative electrode current collector; and
    a negative electrode film provided on the negative electrode current collector and comprising a negative electrode active material, a negative electrode conductive agent and a negative electrode binder;
    wherein,
    the negative electrode active material comprises a chelating resin and a metal ion;
    the chelating resin comprises a polymer skeleton and a chelating functional group;
    the chelating functional group is fixedly connected to the polymer skeleton via a chemical bond;
    the metal ion is connected with the chelating resin by an ionic bond and/or a coordinate bond via the chelating functional group;
    the chelating resin further comprises iminodiacetic acid;
    in the chelating resin, a mass percentage of iminodiacetic acid is less than or equal to 1%;
    the metal ion is a divalent or multivalent metal ion.

11. The negative electrode plate according to claim 10, wherein the polymer skeleton is one selected from a group consisting of polystyrene, polyvinyl chloride, polymethacrylate, polyacrylic acid, polyethylene and polypropylene.

12. The negative electrode plate according to claim 10, wherein the chelating functional group is one or more selected from a group consisting of phosphate group, aminophosphate group, aminocarboxylic group, carboxyl group and thioureido group.

13. The negative electrode plate according to claim 10, wherein on the polymer skeleton, a ratio of a number of repeating units connected with the chelating functional group to a number of total repeating units of the polymer skeleton is greater than or equal to 50%.

14. The negative electrode plate according to claim 10, wherein in the chelating resin, the mass percentage of iminodiacetic acid is less than or equal to 0.1%.

15. The negative electrode plate according to claim 10, wherein the metal ion is one selected from a group consisting of $Zn^{2+}$, $Pb^{2+}$, $Sn^{2+}$, $Cd^{2+}$, $Fe^{2+}$ and $Ni^{2+}$.

16. The negative electrode plate according to claim 10, wherein the negative electrode plate further comprises a metal layer, the metal layer is provided between the negative electrode film and the negative electrode current collector and a metal element of the metal layer is the same as the metal ion of the negative electrode active material.

17. A secondary battery, comprising a negative electrode plate;
    the negative electrode plate, comprising:
    a negative electrode current collector; and a negative electrode film provided on the negative electrode current collector and comprising a negative electrode active material, a negative electrode conductive agent and a negative electrode binder;

wherein, the negative electrode active material comprises a chelating resin and a metal ion;

the chelating resin comprises a polymer skeleton and a chelating functional group;

the chelating functional group is fixedly connected to the polymer skeleton via a chemical bond;

the metal ion is connected with the chelating resin by an ionic bond and/or a coordinate bond via the chelating functional group;

the chelating resin further comprises iminodiacetic acid;

in the chelating resin, a mass percentage of iminodiacetic acid is less than or equal to 1%;

the metal ion is a divalent or multivalent metal ion.

18. The secondary battery according to claim 17, wherein the polymer skeleton is one selected from a group consisting of polystyrene, polyvinyl chloride, polymethacrylate, polyacrylic acid, polyethylene and polypropylene.

19. The secondary battery according to claim 17, wherein the chelating functional group is one or more selected from a group consisting of phosphate group, aminophosphate group, aminocarboxylic group, carboxyl group and thioureido group.

20. The secondary battery according to claim 17, wherein the metal ion is one selected from a group consisting of $Zn^{2+}$, $Pb^{2+}$, $Sn^{2+}$, $Cd^{2+}$, $Fe^{2+}$ and $Ni^{2+}$.

* * * * *